US008065079B2

(12) United States Patent
Rogers

(10) Patent No.: US 8,065,079 B2
(45) Date of Patent: Nov. 22, 2011

(54) SYSTEM AND METHOD FOR INDICATING REMINDERS VIA A PORTABLE COMPUTING DEVICE

(75) Inventor: Sean Scott Rogers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/096,892

(22) Filed: Mar. 31, 2005

(65) Prior Publication Data

US 2006/0224319 A1    Oct. 5, 2006

(51) Int. Cl.
*G01C 21/00* (2006.01)
*H04W 36/00* (2009.01)
*G08G 1/123* (2006.01)

(52) U.S. Cl. ........ 701/207; 701/213; 701/214; 455/436; 455/439; 455/440; 455/456.1; 455/456.3; 455/456.6; 455/457; 340/988; 340/995.27; 340/539.11; 340/539.13; 340/539.14; 340/539.19; 340/539.21; 340/539.23

(58) Field of Classification Search .................. 701/213, 701/207, 214; 455/456.1, 456.3, 456.6, 457, 455/436, 439, 440; 340/988, 995.27, 539.11, 340/539.13–539.23
See application file for complete search history.

(56) References Cited

U.S. PATENT DOCUMENTS

| | | | |
|---|---|---|---|
| 3,692,238 A | | 9/1972 | Boyd |
| 5,559,707 A | | 9/1996 | DeLorme et al. |
| 5,627,547 A | * | 5/1997 | Ramaswamy et al. ... 342/357.08 |
| 5,938,721 A | * | 8/1999 | Dussell et al. ................ 701/211 |
| 6,177,905 B1 | * | 1/2001 | Welch ...................... 342/357.13 |
| 6,360,101 B1 | * | 3/2002 | Irvin ........................ 455/456.6 |
| 6,587,782 B1 | * | 7/2003 | Nocek et al. .................. 701/200 |
| 6,591,103 B1 | * | 7/2003 | Dunn et al. .................... 455/436 |
| 6,819,256 B2 | * | 11/2004 | Hampton .................... 340/691.6 |
| 6,819,267 B1 | * | 11/2004 | Edmark et al. ................ 340/988 |
| 6,889,138 B1 | * | 5/2005 | Krull et al. ..................... 701/211 |

(Continued)

FOREIGN PATENT DOCUMENTS

CN    1320003    10/2001

(Continued)

OTHER PUBLICATIONS

Microsoft Windows 2000 Outlook 2000 "Calendar" Introductionn Published on Jun. 7, 1999; http://office.microsoft.com/zh-tw/outlook/HA010549601028.aspx.

(Continued)

*Primary Examiner* — John Nguyen
*Assistant Examiner* — Chuong P Nguyen
(74) *Attorney, Agent, or Firm* — Fariba Yadegar-Bandari

(57) ABSTRACT

A method of processing location data at a portable computing device is provided and includes receiving information associated with a user defined location at the portable computing device. The information includes a central point and an entry indication perimeter. An entry alert associated with the user defined location is received at the portable computing device. The location of the portable computing device is monitored to determine when the portable computing device crosses the entry indication perimeter associated with the central point of the user defined location indicating that the portable computing device is proximate to the user defined location. The method further includes switching the portable computing device from a roaming state to an entry state indicating that the portable computing device is about to enter the user defined location. An indication can be provided to the user that the portable computing device has switched to the entry state.

48 Claims, 12 Drawing Sheets

U.S. PATENT DOCUMENTS

| | | | |
|---|---|---|---|
| 6,912,398 B1 * | 6/2005 | Domnitz | 455/461 |
| 6,925,603 B1 * | 8/2005 | Naito et al. | 715/733 |
| 6,941,127 B2 * | 9/2005 | Muramatsu | 455/404.2 |
| 6,957,076 B2 * | 10/2005 | Hunzinger | 455/456.3 |
| 7,016,855 B2 * | 3/2006 | Eaton et al. | 705/1 |
| 7,039,420 B2 * | 5/2006 | Koskinen et al. | 455/456.1 |
| 7,084,758 B1 * | 8/2006 | Cole | 340/539.11 |
| 7,254,388 B2 * | 8/2007 | Nam et al. | 455/418 |
| 7,394,405 B2 * | 7/2008 | Godden | 340/996 |
| 2002/0086680 A1 | 7/2002 | Hunzinger | |
| 2002/0089421 A1 * | 7/2002 | Farringdon et al. | 340/506 |
| 2003/0143967 A1 | 7/2003 | Ciccarelli et al. | |
| 2005/0239479 A1 * | 10/2005 | Bednasz | 455/456.1 |

FOREIGN PATENT DOCUMENTS

| | | |
|---|---|---|
| JP | 2000199716 | 7/2000 |
| JP | 2003329760 | 11/2003 |
| JP | 2004072313 | 3/2004 |
| JP | 2004235814 | 8/2004 |
| TW | 1228373 | 2/2005 |
| WO | WO9524808 | 9/1995 |
| WO | WO9923591 | 5/1999 |

OTHER PUBLICATIONS

International Search Report—PCT/US2006/012033, International Search Authority—ISA/US—Alexandria, Virginia—Jul. 17, 2007.

Written Opinion—PCT/US2006/012033, International Search Authority—ISA/US—Alexandria, Virginia—Jul. 17, 2007.

International Preliminary Report on Patentability—PCT/US2006/012033, International Search Authority—The International Bureau of WIPO—Geneva, Switzerland—Oct. 3, 2007.

* cited by examiner

SYSTEM AND METHOD FOR INDICATING REMINDERS VIA A PORTABLE COMPUTING DEVICE

BACKGROUND

I. Field

The present disclosure generally relates to portable computing devices. More particularly, the disclosure relates to indicating reminders to a user using a portable computing device.

II. Description of Related Art

Advances in technology have resulted in smaller and more powerful personal computing devices. For example, there currently exist a variety of portable personal computing devices, including wireless computing devices, such as portable wireless telephones, laptop computers, personal digital assistants (PDAs), and paging devices that are small, lightweight, and easily carried by users. More specifically, portable wireless telephones, for example, further include cellular telephones that communicate voice and data packets over wireless networks. Further, many such wireless telephones provide significant computing capabilities, and as such, are becoming tantamount to small personal computers and handheld PDAs.

Typically, these smaller and more powerful personal computing devices are often resource constrained. For example, the screen size, the amount of available memory and file system space, and the amount of input and output capabilities may be limited by the small size of the device. Because of such severe resource constraints, it is can be desirable to maintain a limited size and quantity of software applications and other information residing on such personal computing devices (client computing devices).

Some of these personal computing devices utilize application programming interfaces (APIs) that are sometimes referred to as runtime environments and software platforms. The APIs can be installed onto a local computer platform and can be used to simplify the operation and programming of such devices by providing generalized calls for device specific resources. Further, some APIs can provide software developers the ability to create software applications that are fully executable on such devices. In addition, APIs can provide an interface between a personal computing device system hardware and the software applications. As such, the personal computing device functionality can be made available to the software applications without requiring the software developer to access the source code of the specific personal computing device. Further, some APIs can provide mechanisms for secure communications between personal devices, such as client devices and server systems, using secure cryptographic key information.

Examples of such APIs, some of which are discussed in more detail below, include those currently publicly available versions of the Binary Runtime Environment for Wireless® (BREW®) software, developed by Qualcomm, Inc. of San Diego, Calif. BREW® can be described as a thin veneer that exists over the operating system of a computing device, such as a wireless cellular phone. BREW® can provide a set of interfaces to particular hardware features found on personal computing devices.

Further, BREW® is advantageous in that it can be provided on personal computing devices at a relatively low cost with respect to the demands on device resources and with respect to the prices typically paid by consumers for devices containing the BREW® APIs. Additionally, BREW® provides an end-to-end software distribution platform that includes a variety of benefits for wireless service operators, software developers and computing device consumers. One such currently available end-to-end software distribution platform includes logic distributed over a server-client architecture, wherein the server can perform billing, security, and application distribution functionality, and wherein the client can perform application execution, security and user interface functionality.

Oftentimes, a user forgets his or her portable computing device, e.g., when going to work. Further, many users often forget other items, such as car keys, glasses, etc., when traveling. Accordingly, it would be advantageous to provide a portable computing device that can provide reminders to users.

SUMMARY

A method of processing location data at a portable computing device is provided and includes receiving information associated with a user defined location at the portable computing device. The information includes a central point and an entry indication perimeter. Further, the method includes receiving an entry alert associated with the user defined location at the portable computing device. Also, a location of the portable computing device is monitored. Moreover, it is determined when the portable computing device crosses the entry indication perimeter associated with the central point of the user defined location indicating that the portable computing device is proximate to the user defined location.

In a particular embodiment, the entry indication perimeter is a distance from the central point. Also, the entry alert can be a recurring entry alert or a one time only entry alert. In a particular embodiment, the method further includes switching the portable computing device from a roaming state to an entry state to indicate that the portable computing device is about to enter the user defined location. Particularly, an indication can be provided to the user that the portable computing device has switched to the entry state.

Additionally, in a particular embodiment, the entry alert is presented to a user of the portable computing device when the portable computing device switches to the entry state. However, an indication can be received from the user to prevent the portable computing device from switching to the entry state. Also, when the portable computing device is prevented from switching to the entry state, the entry indication perimeter can be modified, e.g., reduced.

In a particular embodiment, after the alert is presented to the user, the portable computing device switches from the entry state to a home state. The portable computing device may wait a predetermined time period before switching to the home state.

Further, in a particular embodiment, the method can include determining whether the portable computing device is moving toward the central point. If so, a reminder can be presented to a user via the portable computing device.

In another embodiment, a method of providing alerts via a portable computing device is provided and includes receiving information associated with a user defined location at the portable computing device. The information includes a central point and a departure indication perimeter. A departure alert is received and is associated with the user defined location at the portable computing device. Further, the location of the portable computing device is monitored to determine when the portable computing device crosses the departure indication perimeter associated with the central point of the user defined location.

In yet another embodiment, a method of reminding a user via a portable computing device is provided and includes sounding a wake alarm at the portable computing device, when a wake time is reached. Also, at a predetermined time before a predetermined departure time a reminder alarm is sounded. Thereafter, it is determined whether the reminder alarm is acknowledged. If not, the volume of the reminder alarm is increased.

In still another embodiment, a portable computing device is provided and includes a processor, a memory device accessible by the processor, and a global positioning module. The portable computing device also includes a computer program that is embedded within the memory and that is responsive to the global positioning module. The computer program includes instructions to monitor a location of the portable computing device and instructions to determine when the portable computing device crosses an entry indication perimeter associated with a user defined point indicating that the portable computing device is proximate to a user defined location.

In yet still another embodiment, a portable computing device is provided and includes a processor, a memory device accessible by the processor, and a location determination module that is embedded within the memory device. The portable computing device also includes a computer program that is embedded within the memory. The computer program also includes instructions to monitor a location of the portable computing device. Particularly, the location is determined by the location determination module. Further, the computer program includes instructions to determine when the portable computing device crosses a departure indication perimeter associated with the user defined point of the user defined location indicating that the portable computing device is about to depart the user defined location.

In another embodiment, a portable computing device includes a processor, a memory device that is accessible by the processor, and a computer program that is embedded within the memory. Particularly, the computer program includes instructions to sound a wake alarm and instructions to sound a reminder alarm a predetermined time before a predetermined departure time. Further, the computer program includes instructions to determine whether the reminder alarm is acknowledged.

In still another embodiment, a user interface for a portable computing device is provided and includes a set home point button. Particularly, in response to selection of the set home point button, one or more location coordinates associated with a home point location are saved at the portable computing device.

In yet another embodiment, a computer program is provided and is embedded within a computer readable medium. The computer program includes instructions to monitor the location of a portable computing device outside of a virtual perimeter around a user defined point. Also, the computer program includes instructions to determine whether the portable computing device crosses an entry indication perimeter around the virtual perimeter indicating that the portable computing device is proximate to the virtual perimeter.

In still yet another embodiment, a computer program is provided and is embedded within a computer readable medium. The computer program includes instructions to monitor a location of the portable computing device within a virtual perimeter around a user defined point. Further, the computer program includes instructions to determine whether the portable computing device crosses a departure indication perimeter within the virtual perimeter indicating that the portable computing device is about to cross the virtual perimeter.

In another embodiment, a computer program is embedded within a computer readable medium and includes instructions to sound a wake alarm and instructions to sound a reminder alarm at a predetermined time before a predetermined departure time is reached. Additionally, the computer program includes instructions to determine whether the reminder alarm is acknowledged and instructions to increase a volume of the reminder alarm when the reminder alarm is not acknowledged.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a computing device. It will be recognized that various actions described herein could be performed by specific circuits, e.g., application specific integrated circuits (ASICs), by program instructions being executed by one or more processors, or by a combination of both.

Further, the embodiments described herein can additionally be considered to be embodied entirely within any form of computer readable storage medium having stored therein a corresponding set of computer instructions that upon execution would cause an associated processor to perform the functionality described herein. Thus, various aspects of the disclosure may be embodied in a number of different forms, all of which have been contemplated to be within the scope of the claimed subject matter. In addition, for each of the embodiments described herein, the corresponding form of any such embodiment may be described herein as, for example, "logic configured to" perform a certain action or "code operable to" perform the described action. The following detailed description describes methods, systems, software and apparatus used in connection with one or more portable computing devices.

In one or more embodiments, a personal computing device may utilize a runtime environment, such as a version of the Binary Runtime Environment for Wireless® (BREW®) software platform developed by QUALCOMM, Inc., of San Diego, Calif. In at least one embodiment in the following description, the system used to provide communications between client computing devices and servers is implemented on a computing device executing a runtime environment, such as the current version of the BREW® software platform. However, one or more embodiments of the system used to provide communications between client computing devices and servers are suitable for use with other types of runtime environments that, for example, operate to control the execution of applications on wireless client computing devices.

Figure 1:
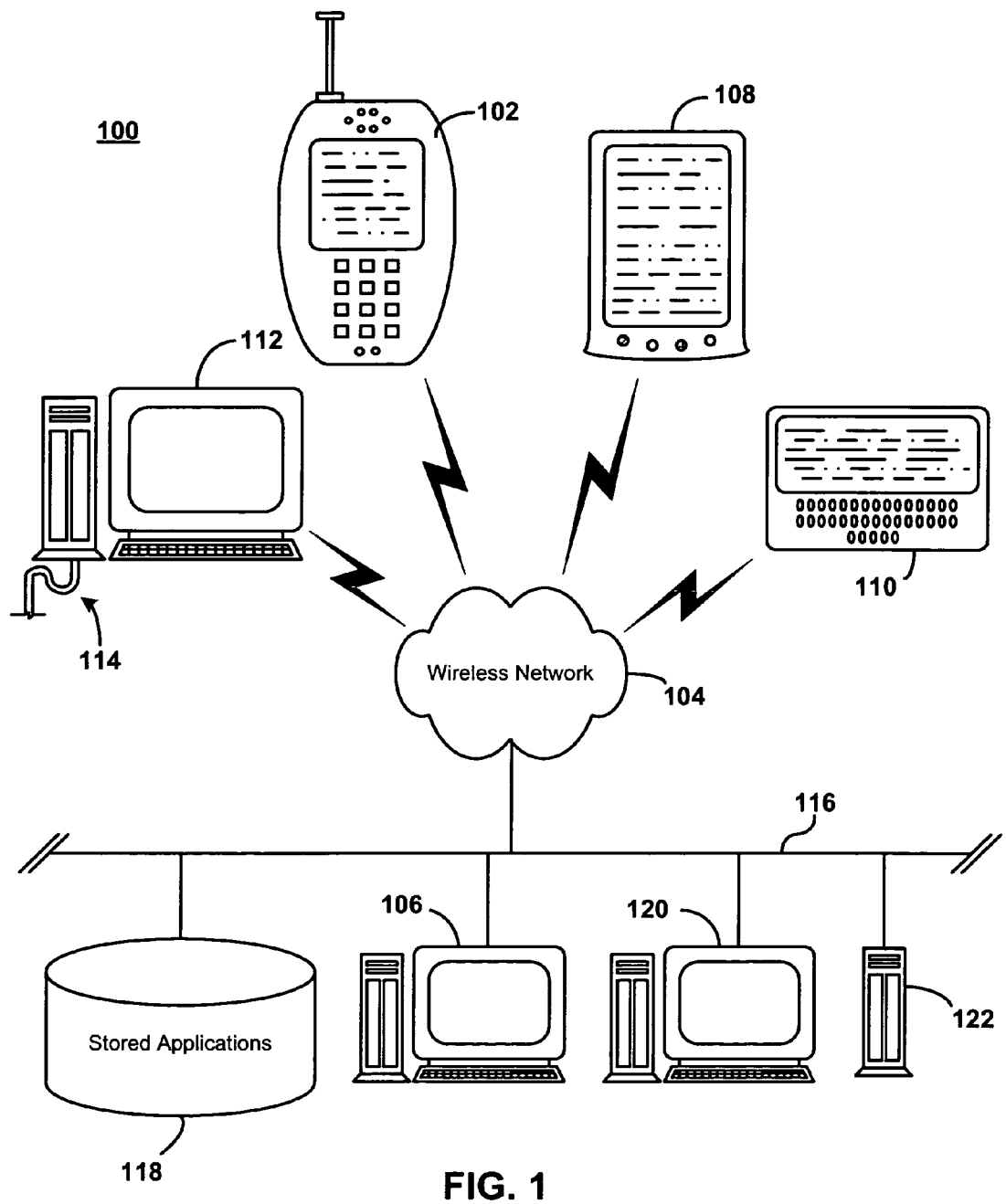
FIG. 1 is a general diagram of a particular embodiment of a system providing communications between a client computing device and a server.

FIG. 1 illustrates a block diagram of an exemplary, non-limiting embodiment of a system 100 that may perform the loading, reloading, and deletion of software application components on a portable computing device, such as cellular telephone 102. The cellular telephone 102 communicates across a wireless network 104 with at least one application server 106. Further, the application server 106 can selectively transmit one or more software applications and components to one or more portable computing devices across a wireless communication portal or other node having data access to the wireless network 104.

As illustrated in FIG. 1, the portable computing device can be a cellular telephone 102, a personal digital assistant 108, a pager 110, or a separate computer platform 112 that has a wireless communication portal. In a particular embodiment, the pager 110 can be a two-way text pager. Further, in an alternative embodiment, the portable computing device can have a wired connection 114 to a network or the Internet. The exemplary, non-limiting system can include any form of a remote module including a wireless communication portal, including without limitation, wireless modems, PCMCIA cards, personal computers, access terminals, telephones with or without a display or keypad, or any combination or sub-combination thereof.

As depicted in FIG. 1, the application download server 106 is coupled to a network 116 with other computer elements in communication with the wireless network 104. The system 100 includes a second server 120 and a stand-alone server 122, and each server can provide separate services and processes to the portable computing devices 102, 108, 110, 112 across the wireless network 104. Further, as indicated in FIG. 1, the system 100 also includes at least one stored application database 118 that stores software applications that are downloadable by the portable computing devices 102, 108, 110, 112. Different embodiments are contemplated that locate logic to perform secure communications at any one or more of the application download server 106, the second server 120 and the stand-alone server 122.

Figure 2:
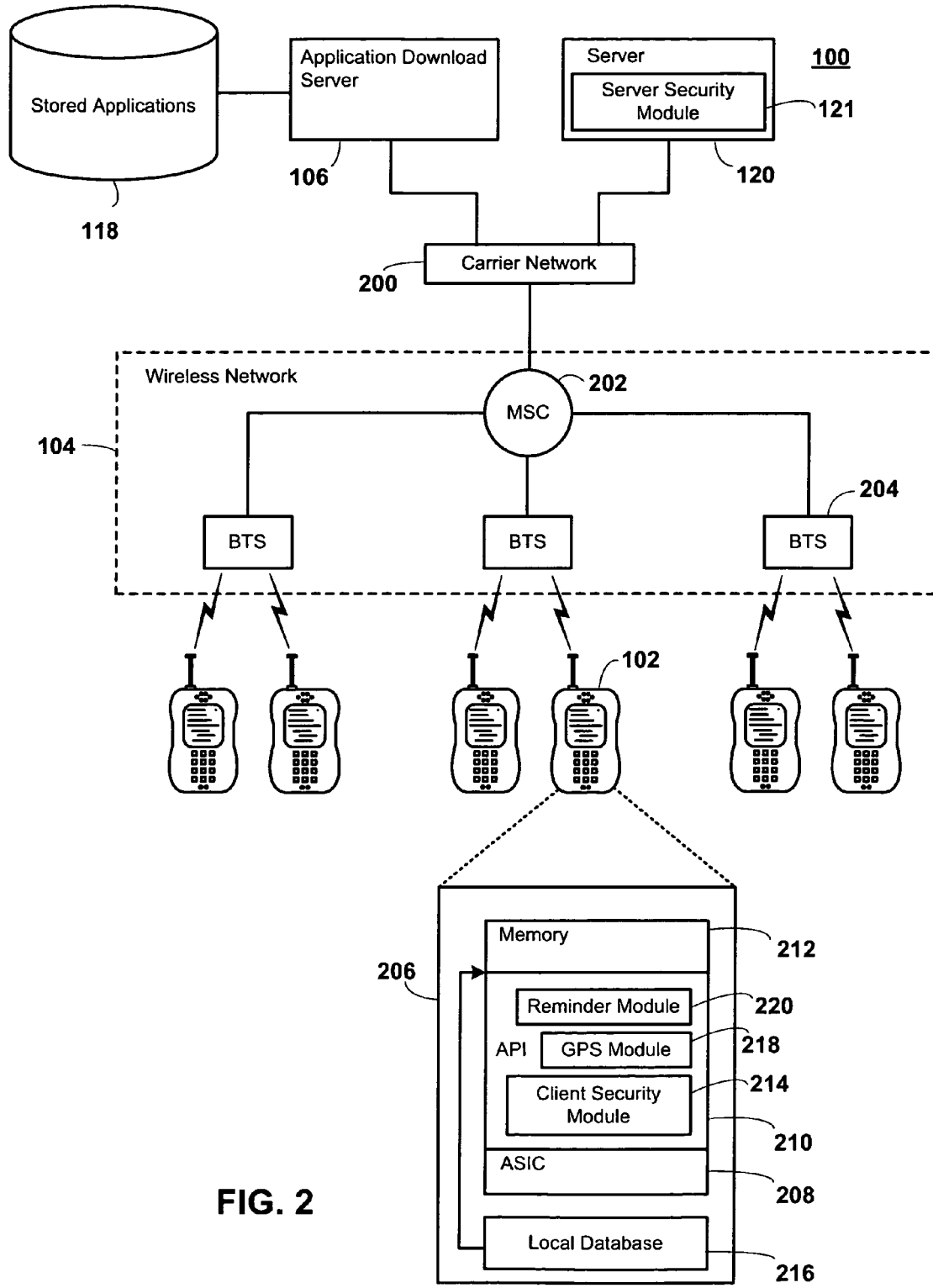
FIG. 2 is a general diagram that illustrates further details of the particular embodiment of the system of FIG. 1.

In FIG. 2, a block diagram is shown that more fully illustrates the system 100, including the components of the wireless network 104 and interrelation of the elements of the system 100. The system 100 is merely exemplary and can include any system whereby remote modules, such as the wireless client computing devices 102, 108, 110, 112 communicate over-the-air between and among each other and/or between and among components connected via a wireless network 104, including, without limitation, wireless network carriers and/or servers. The application download server 106 and the stored application database 118, along with any other servers, such as server 120, are compatible with wireless communication services and can communicate with a carrier network 200 through a data link, such as the Internet, a secure LAN, WAN, or other network. In an illustrative embodiment, the server 120 contains a server security module 121 that further contains logic configured to provide for secure communications over the carrier network 200. In a particular embodiment, the server security module 121 can operate in conjunction with a client security module located on a client computing device, such as portable computing devices 102, 108, 110, 112, to provide secure communications.

The carrier network 200 controls messages (sent as data packets) sent to a mobile switching center ("MSC") 202. The carrier network 200 communicates with the MSC 202 by a network, such as the Internet and/or POTS ("plain ordinary telephone system"). Typically, the network connection between the carrier network 200 and the MSC 202 transfers data, and the POTS transfers voice information. The MSC 202 is connected to multiple base transceiver stations ("BTS") 204. The MSC 202 can be connected to the BTS 204 by both a data network and/or Internet for data transfer and POTS for voice information. The BTS 204 ultimately broadcasts messages wirelessly to the portable computing devices, such as to cellular telephone 102, by the short messaging service ("SMS"), or other over-the-air methods known in the art.

The portable computing device, e.g., a wireless client computing device, such as cellular telephone 102, has a computer platform 206 that can receive and execute software applications transmitted from the application download server 106. The computer platform 206 may be implemented as an application-specific integrated circuit ("ASIC" 208), a processor, microprocessor, logic circuit, or other data processing device. The ASIC 208 is installed at the time of manufacture, of the portable computing device. The ASIC 208 or other processor can execute an application programming interface ("API") 210 layer that interfaces with resident programs in the memory 212 of the portable computing device. The memory 212 can be comprised of read-only or random-access memory (ROM or RAM), EEPROM, flash memory, or any other memory suitable for computer platforms.

The API 210 also includes a client security module 214 containing logic configured to provide for secure communications over the carrier network 200. In a particular embodiment, the client security module 214 can operate in conjunction with the server security module 121 to provide secure communications. As illustrated in FIG. 2, the computer platform 206 can further include a local database 216 that can hold applications not actively used in memory 212. In an illustrative embodiment, the local database 216 is stored within a flash memory cell, but it can be stored within any secondary storage device as known in the art, such as magnetic media, EEPROM, optical media, tape, or floppy or hard disk.

A wireless client computing device, for example, the cellular telephone 102, can download one or more software applications, such as games, news, stock monitors, and the like, from the application download server 106. Further, the wireless computing device can store the downloaded applications in the local database 216, when not in use, and can load stored resident applications from the local database 216 to memory 212 for execution by the API 210 when desired by the user. Further, communications over the wireless network 104 may be performed in a secure manner, at least in part, due to the interaction and operation of the client security module 214 and the server security module 121. FIG. 2 further illustrates that the API 210 can include a global positioning system (GPS) module 218 that can be used to determine the location of the portable computing device 102. Also, the API 210 can include a reminder module 220 that can be executed in order to send reminders or alerts to a user based on the location of the portable computing device 102. In a particular embodiment, the reminder module 220 can be downloaded to the portable computing device 102 from the application download server 106 via an over the air interface.

Figure 3:
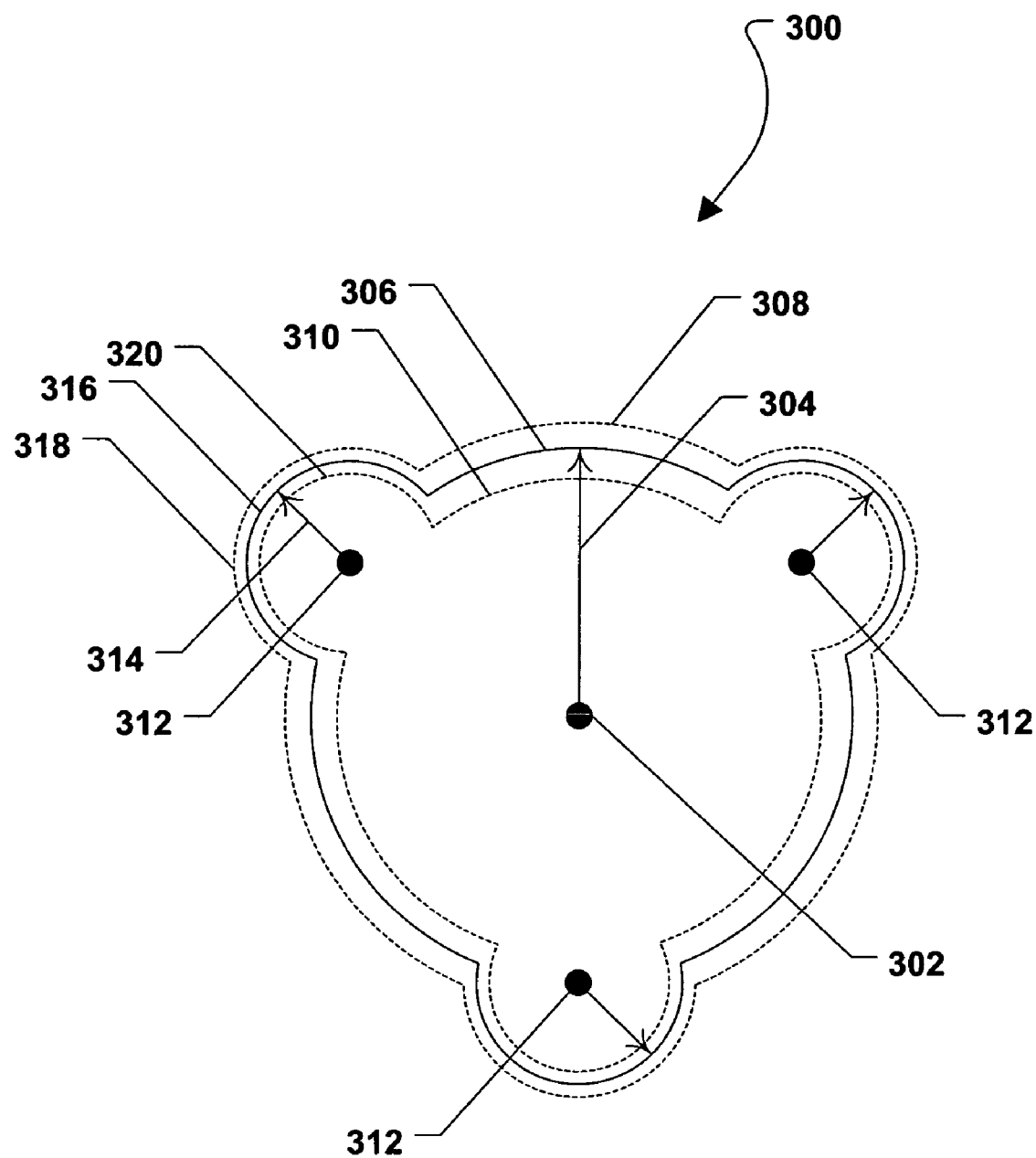
FIG. 3 is a diagram of a home location.

FIG. 3 illustrates a map of a home location, generally designated 300. In an exemplary, non-limiting embodiment, the home location 300 can be a house, an office, or any other location of interest to a user. As shown, the home location 300 includes a home point 302. In a particular embodiment, the home point 302 is a primary central point that represents the approximate center of the home location 300. A home radius 304 extends from the home point 302 and indicates an approximate distance to a virtual perimeter 306 around the home location 300. In a particular embodiment, the virtual perimeter 306 is a circle around the home point 302. Further, in a particular embodiment, a user can indicate the home point 302 by physically moving a GPS enabled portable computing device to the home point 302 and toggling a button at the portable computing device to input the coordinates associated with the home point 302.

As shown in FIG. 3, an entry indication perimeter 308 can be established around the virtual perimeter 306. In an illustrative embodiment, the entry indication perimeter 308 can be established by adding a predetermined distance to the home radius 304. Particularly, the predetermined distance can be user defined. As described in detail below, when a user approaches the virtual perimeter 306 of the home location 300, while carrying the portable computing device, and crosses the entry indication perimeter 308, the portable computing devices switches itself from a roaming mode to an entry mode and begins indicating entry alerts to the user. For example, an entry alert can be an indication to a user to not leave his or her glasses, cellular phone, etc. in a car.

FIG. 3 also depicts a departure indication perimeter 310 that can be established within the virtual perimeter 306. Particularly, the departure indication perimeter 310 can be established by subtracting a predetermined distance from the home radius 304. The distance can be user defined. As described in detail below, when a user is leaving the home location 300, while carrying the portable computing device, and crosses the departure indication perimeter 310, the portable computing device switches itself from a home mode to a departure mode and begins indicating departure alerts to the user. For example, a departure alert can be a reminder to a user not to forget his or her car keys, laptop, glasses, tickets, etc.

FIG. 3 shows one or more subpoints 312 that can be input to the portable computing device by a user. Particularly, each subpoint 312 can be input to the portable computing device when the user is alerted, either when entering or departing, and the user has not quite reached the entry indication perimeter 308 or the departure indication perimeter 310. Each subpoint 312 can includes a user defined subpoint radius 314 that represents the distance to a virtual perimeter modification 316 around the subpoint 312. Additionally, an entry indication perimeter modification 318 can be established around the virtual perimeter modification 316. A departure indication perimeter modification 320 can also be established within the virtual perimeter modification 316 around the subpoint 312. Accordingly, the virtual perimeter 306 around the home point 302 can be modified as needed in order to extend the virtual perimeter 306 of the home location 300 around a parking garage, a swimming pool, detached building, etc.

Figure 4:
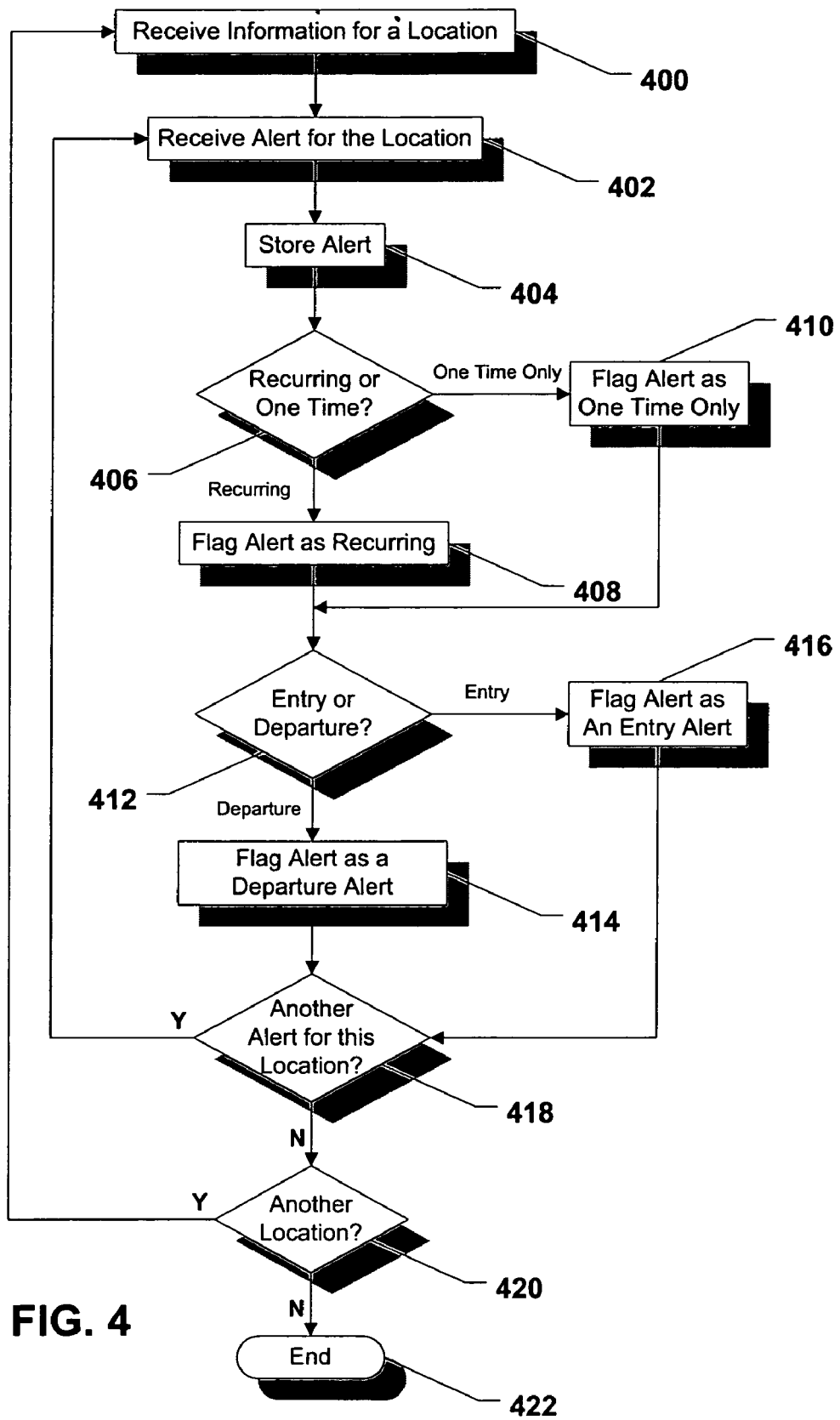
FIG. 4 is a flow chart illustrating a method of configuring a portable computing device to send alerts to a user.

Referring now to FIG. 4, a method of configuring a portable computing device to alert a user when the user enters or leaves a particular location is shown and commences at block 400. At block 400, the portable computing device receives information for a location from a user. In a particular embodiment, the information includes the name of the location, a home point associated with the location, and a home location radius associated with the location. Further, the information can include subpoints associated with the location and a subpoint radius for each subpoint. At block 402, the portable computing device receives an inputted alert for the location. In a particular embodiment, the alert can be a reminder to a user to not forget something such as car keys, lunch money, opera tickets, a cellular telephone, a wallet, a purse, a laptop computer, a portable digital assistant, a pager, a briefcase, etc.

Moving to block 404, the alert is stored at the portable computing device. Thereafter, at decision step 406, the portable computing devices queries the user in order to determine whether the alert is a recurring alert or a one time only alert. If the alert is a recurring alert, the method moves to block 408 and the portable computing device flags the alert as a recurring alert. On the other hand, if the alert is a one time only alert, the portable computing device flags the alert as a one time only alert, at block 410.

Continuing to decision step 412, the portable computing device queries the user in order to determine whether the alert is an entry alert or a departure alert. If the user indicates that the alert is a departure alert, the method moves to block 414 and the portable computing device flags the alert as a departure alert. Conversely, if the user indicates that the alert is an entry alert, the method proceeds to block 416. At block 416, the portable computing device flags the alert as an entry alert. Accordingly, a particular alert may be flagged as a recurring entry alert, a one-time only entry alert, a recurring departure alert, or a one-time only departure alert.

At decision step 418, the portable computing device can query the user in order to determine whether the user would like to input another alert for this particular location. If the user has would like to input another alert for this location, the method returns to block 402 and continues as described. If the user does, not want to input another alert for this particular location, the method moves to decision step 420 and the portable computing device can query the user in order to determine whether the user has another location to set one or more alerts. If the user does have another location where the user wants to set one or more alerts, the method returns to block 400 and continues as above for a new location. On the other hand, if the user does not have another location, the method ends at state 422.

Figure 5:
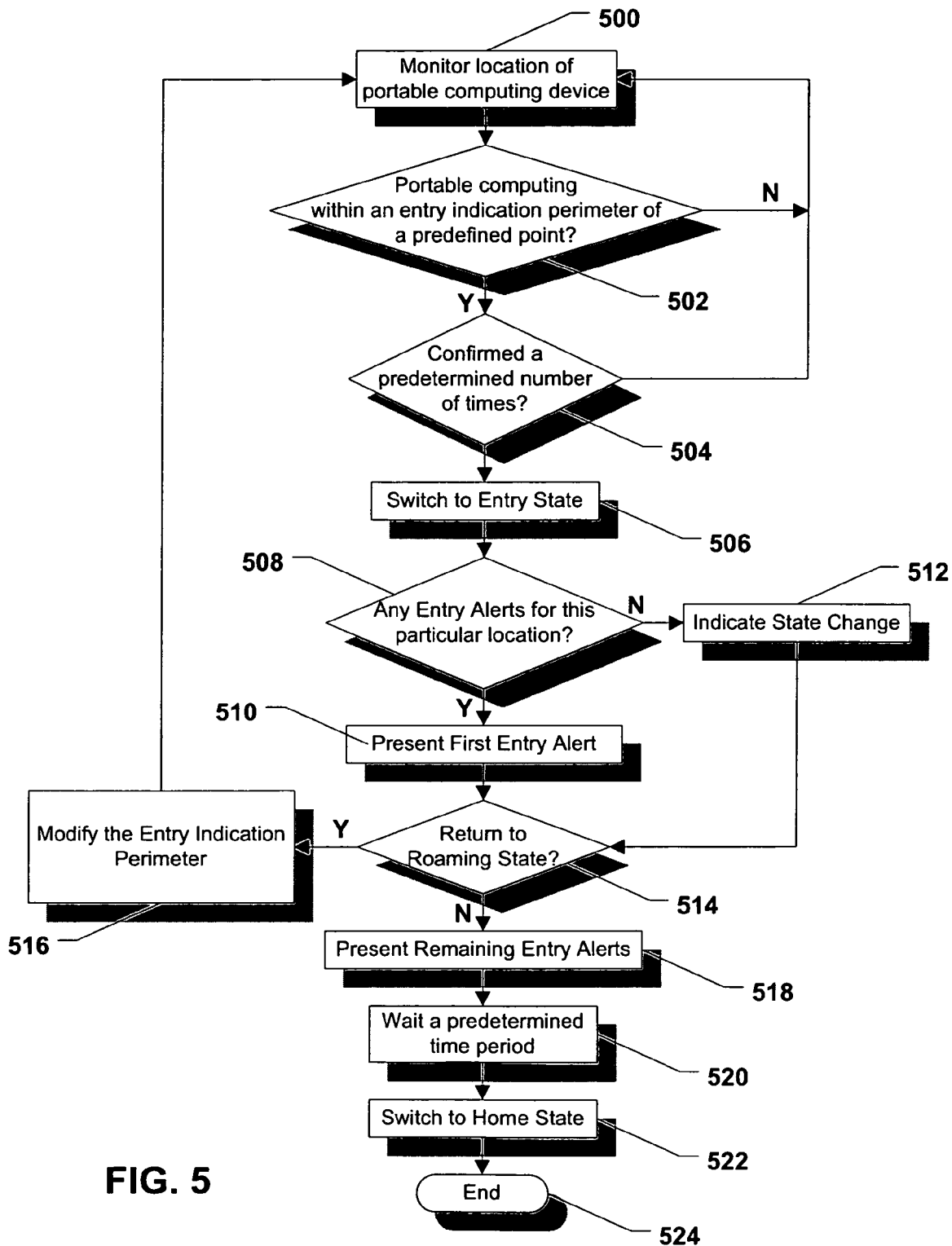
FIG. 5 is a flow chart illustrating a first method of alerting a user via a portable computing device.

FIG. 5 depicts a first method of alerting a user via a portable computing device. Beginning at block 500, a GPS module monitors the location of the portable computing device. At decision step 502, the GPS module determines whether the portable computing device is within an entry indication perimeter relative to a predefined point. In a particular embodiment, the predefined point is a user-defined point. If the portable computing device is not within the entry indication perimeter, the method returns to block 500 and the GPS module continues to monitor the location of the portable computing device.

If the portable computing device is within the entry indication perimeter, the method proceeds to decision step 504 and the GPS module confirms a predetermined number of times that the portable computing device has crossed the entry indication perimeter. If the GPS module is not successful in confirming crossing of the entry indication perimeter, the method returns to block 500 and continues as described herein. Conversely, if the GPS module is successful in its confirmation, the method continues to block 506 and the portable computing device switches itself from a roaming state to an entry state. Next, at decision step 508, the portable computing device determines whether there are any entry alerts for the location associated with the user-defined point. If so, the portable computing device presents a first entry alert at block 510, and the method then moves to decision step 514. If the portable computing device determines that there are no alerts for the location associated with the user-defined point, the method proceeds to block 512 and the portable computing device indicates a state change. The presentation of the alert can be by a special sound, a digital verbal recording, etc. The method then moves to decision step 514.

At decision step 514, the portable computing device queries the user to determine whether the user would like to return the portable computing device to the roaming state. If the user chooses to return the portable computing device to the roaming state, the method proceeds to block 516 and the entry indication perimeter is modified. Particularly, the size of the entry indication perimeter is reduced.

Returning to decision step 514, if the user chooses not to return the portable computing device to the roaming state, the method moves to block 518 and the remaining entry alerts for the location are presented. Next, at block 520, the portable computing device waits a predetermined time period. In a particular embodiment, the predetermined time period is user defined. At block 522, the portable computing device switches itself to a home state. In a particular embodiment, the wait period prevents the portable computing device from switching too quickly to the home state to avoid triggering departure alerts since the device has not yet moved within the departure indication perimeter. The method ends at block 524.

Figure 6:
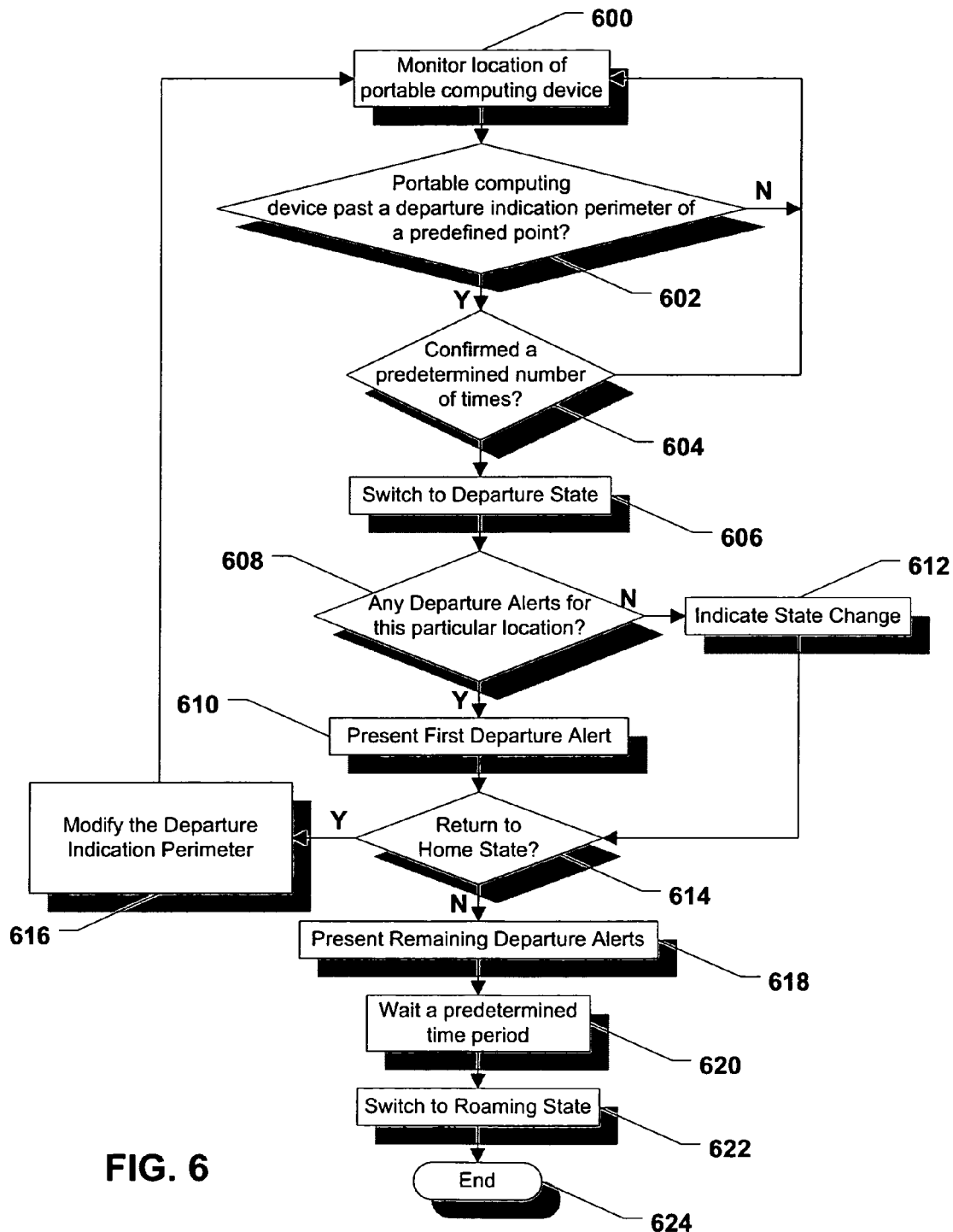
FIG. 6 is a flow chart illustrating a second method of alerting a user via a portable computing device.

Referring now to FIG. 6, a second method of alerting a user via a portable computing device is shown and starts at block 600. At block 600, the GPS module monitors the location of the portable computing device. At decision step 602, the GPS module determines whether the portable computing device has moved beyond a departure indication perimeter that is relative to a predefined point. In a particular embodiment, the predefined point is a user-defined point, such as a user's home or work location. Further, in a particular embodiment, the departure indication perimeter can be user defined and can be a distance from the user-defined point. If the portable computing device has not moved beyond the departure indication perimeter, the method returns to block 600 and the GPS module continues to monitor the location of the portable computing device.

If the portable computing device has moved beyond the departure indication perimeter, the method proceeds to decision step 604 and the GPS module confirms a predetermined number of times that the portable computing device has crossed the departure indication perimeter. If the GPS module is not successful, the method returns to block 600 and continues as described. Conversely, if the GPS module is successful in its confirmation, the method continues to block 606 and the portable computing device switches itself from a roaming state to a departure state. Next, at decision step 608, the portable computing device determines whether there are any departure alerts for the location associated with the user-defined point. If so, the portable computing device presents a first departure alert. The method then moves to decision step 614. If the portable computing device determines that there are no departure alerts for the location associated with the user-defined point, the method proceeds to block 612 and the portable computing device indicates a state change. The method then moves to decision step 614.

At decision step 614, the portable computing device queries the user to determine whether the user would like to return to the home state. If the user chooses to return the portable computing device to the home state, the method proceeds to block 616 and the departure indication perimeter is modified. Particularly, the departure indication perimeter is increased.

Returning to decision step 614, if the user chooses not to return the portable computing device to the home state, the method moves to block 618 and the remaining departure alerts are presented. Next, at block 620, the portable computing device waits a predetermined time period. In a particular embodiment, the predetermined time period is user defined. At block 622, the portable computing device switches itself to a roaming state and the method ends at block 624.

Each method shown in FIG. 5 and FIG. 6 uses distance as a way to determine whether the portable computing device is entering or departing a particular location. However, direction of travel, distance, and travel velocity can be used to determine an estimated time of arrival or an estimated time of departure at a particular location. Based on the estimated time of arrival or the estimated time of departure, the portable computing device can alert the user just before arriving at or departing from a particular location.

Figure 7:
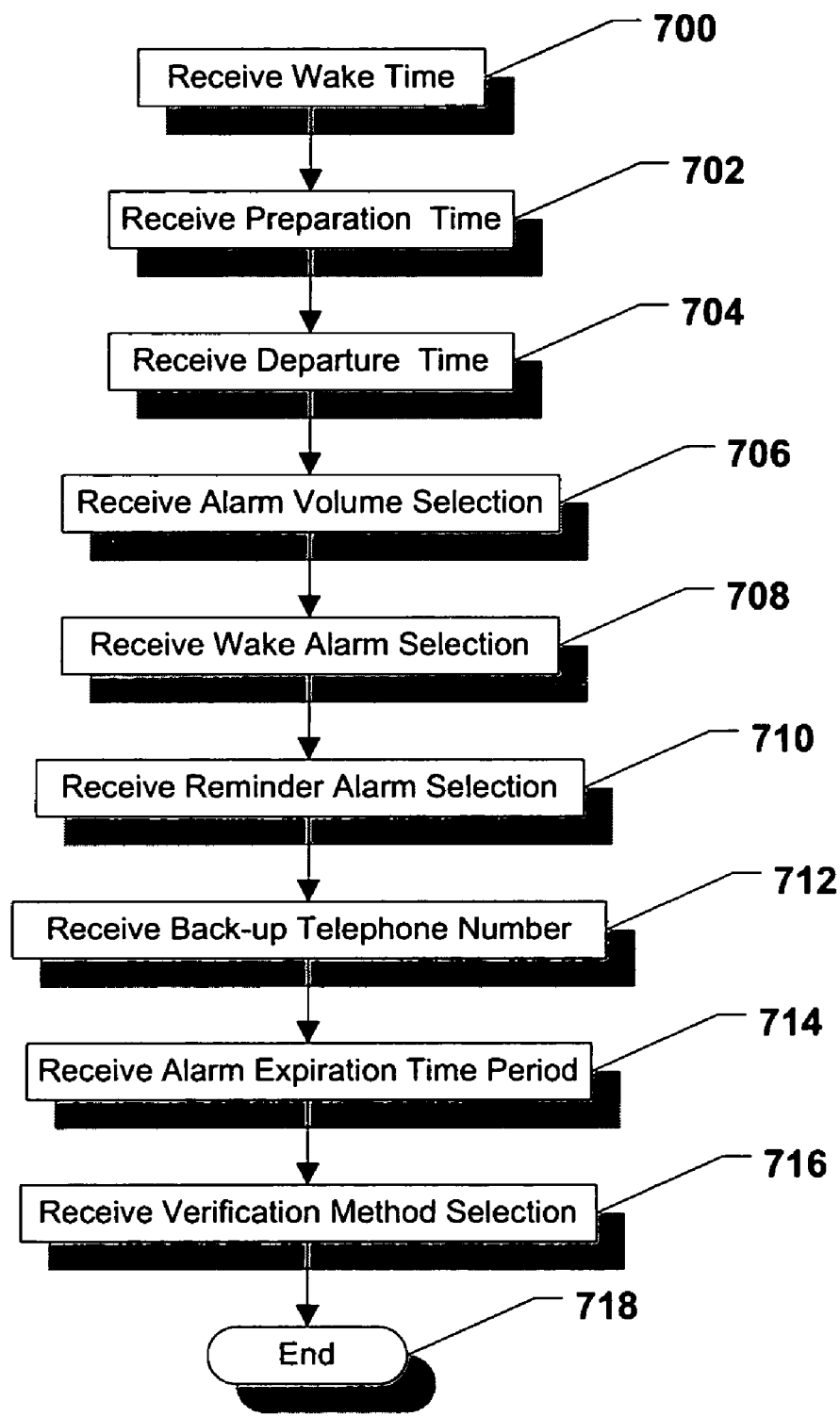
FIG. 7 is a flow chart illustrating a method of configuring a portable computing device to wake a user and remind the user to not forget the portable computing device.

FIG. 7 illustrates a method of configuring a portable computing device to wake a user and to remind the user to not forget the portable computing device. At block 700, the portable computing device receives a wake time from a user. Next, at block 702, the portable computing device receives a preparation time. In a particular embodiment, the preparation time is the time that it typically takes a user to get ready to leave the location, e.g., the time it takes the user to shower, to have breakfast, etc., before leaving for work.

Moving to block 704, the portable computing device receives a departure time. The departure time is the time that the user expects to leave home, e.g., to go to work. At block 706, the portable computing device receives an alarm volume selection. The alarm volume selection can be chosen from a range of alarm volumes. Proceeding to block 708, the portable computing device receives a selection of a wake alarm type, e.g., a song, a sound, or other type of audible signal. At block 710, the portable computing device receives a selection of a reminder alarm. In a particular embodiment, the reminder alarm can be a song, a sound, or other type of audible signal. Continuing to block 712, the portable computing device receives a back-up telephone number. Particularly, the back-up telephone number is a telephone number that the portable computing device can contact if the user fails to respond to a wake alarm.

At block 714, the portable computing device receives an alarm expiration time period. In an illustrative embodiment, the alarm expiration time period is an amount of time that the portable computing device waits before automatically turning off the wake alarm if the user fails to turn off the wake alarm. Next, at block 716, the portable computing device receives a verification method selection, e.g., the manner in which a user can acknowledge a reminder alarm. In a non-limiting, exemplary embodiment, the verification method can be disconnecting the portable computing device from a charger, the verification method can be a key press, or the verification method can be a GPS method in which the GPS module detects when the portable computing device has moved a particular distance from the user-defined point indicating that the portable computing device has left a particular location, e.g., a user's home. The method then ends at state 718.

Figure 8:
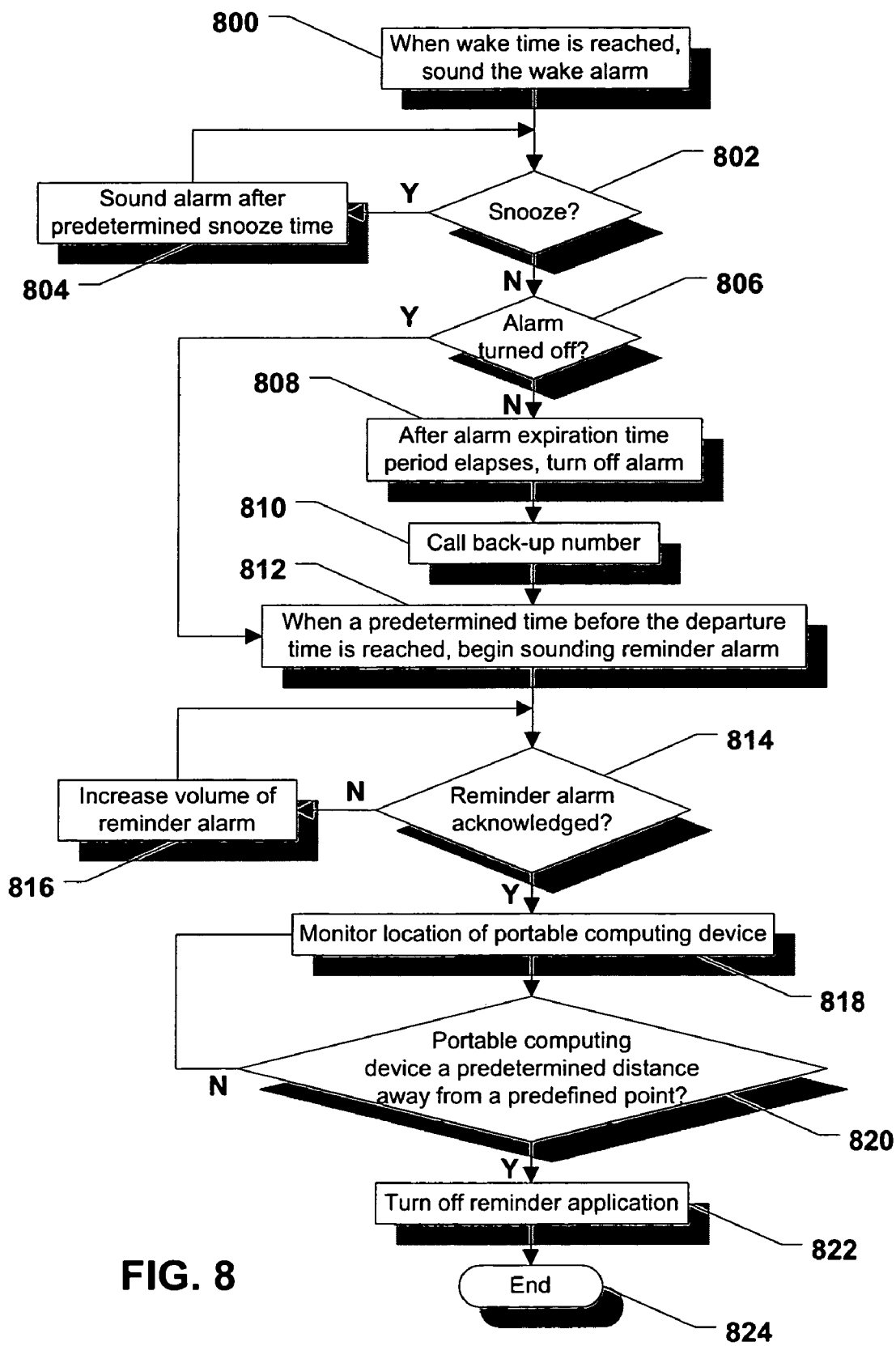
FIG. 8 is a flow chart illustrating a method of waking a user via a portable computing device and reminding the user to not forget the portable computing device.

Referring now to FIG. 8, a method of waking a user via a portable computing device and reminding a user not to forget the portable computing device when leaving home is shown and commences at block 800. At block 800, when a wake time is reached, the portable computing device sounds the wake alarm. At decision step 802, the portable computing device determines whether a snooze button has been toggled. If so, the method proceeds to block 804 and the portable computing device sounds a wake alarm after a predetermined snooze time. If the snooze button is not toggled, the method moves to decision step 806, and the portable computing device determines whether the wake alarm has been turned off.

If the wake alarm is not turned off by the user, the method continues to decision step 808 and after the alarm expiration time period elapses, the portable computing device automatically turns off the wake alarm. Thereafter, at block 810, the portable computing device automatically calls the back-up number input by the user. The method then moves to block 812. The method also moves to block 812, if the portable computing device determines that the alarm is turned off by the user at decision step 806.

At block 812, when a predetermined time before the departure time is reached, the portable computing device begins sounding a reminder alarm. Continuing to decision step 814, the portable computing device determines whether the reminder alarm is acknowledged by the user. If not, the method moves to block 816 and the portable computing device increases the volume of the reminder alarm. The method then returns to decision step 814. At decision step 814, if the reminder alarm is acknowledged, the method continues to block 818 and the GPS module monitors the location of the portable computing device. Thereafter, at block 820, the GPS module determines whether the portable computing device has moved a predetermined distance away from the user defined point indicating that the portable computing device has left a location, e.g., a home, with a user. If not, the method returns to block 818 and continues. If so, the method moves to block 822 and the reminder application is disabled. Then, the method ends at state 824.

Figure 9:
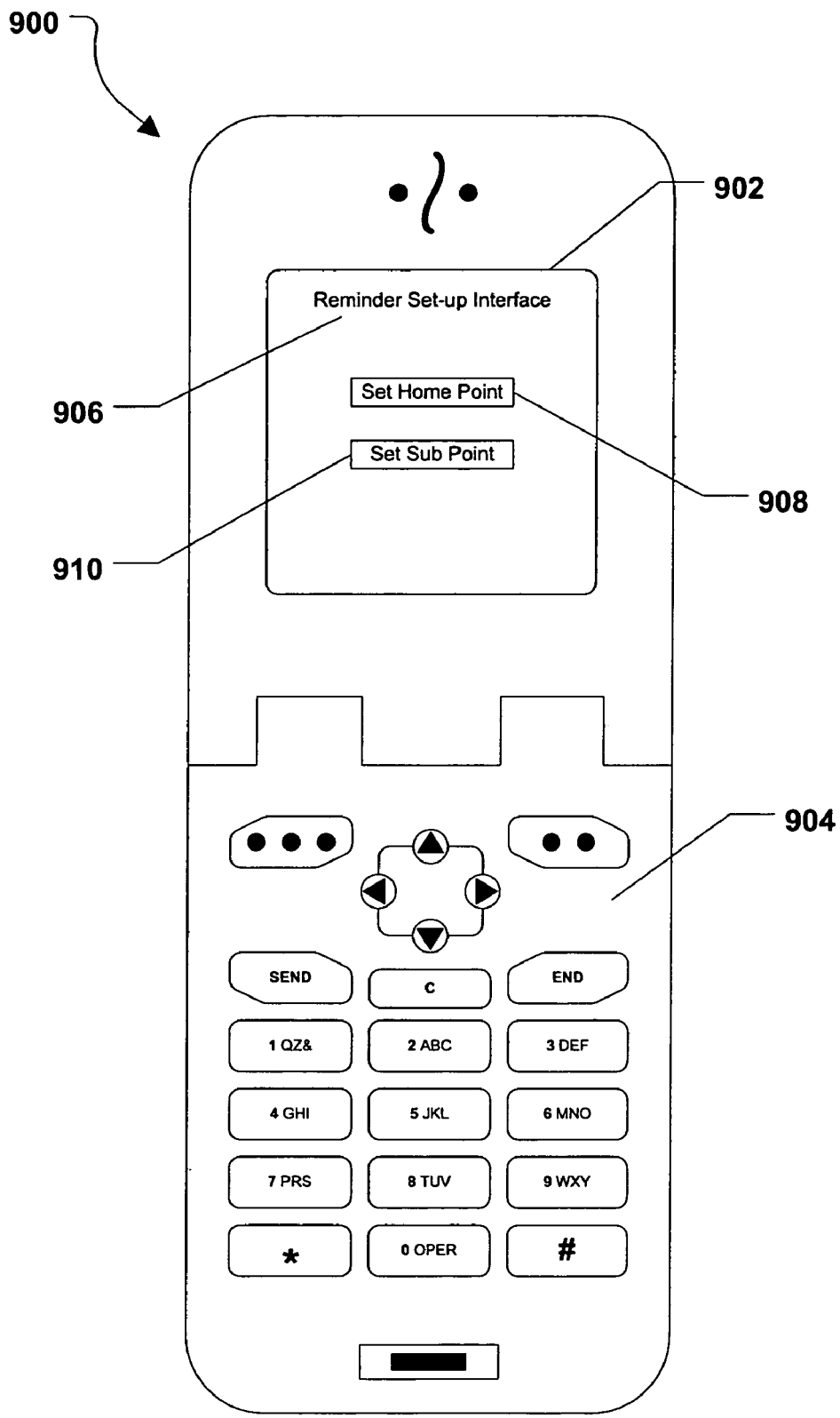
FIG. 9 is a diagram of a portable computing device showing a first user interface.

Referring now to FIG. 9, a portable computing device is shown and is generally designated 900. As shown, the portable computing device includes a display 902 and a keypad 904. A reminder set-up interface 906 can be presented to a user via the display 902. The reminder set-up interface 906 can include a "set home point" soft button 908 and a "set sub point" soft button 910. When the "set home point" soft button 908 is selected, the GPS coordinates associated with the home point are saved at the portable computing device. Moreover, a home point set-up interface 1000, shown in FIG. 10, can be presented to the user via the display 902.

Figure 10:
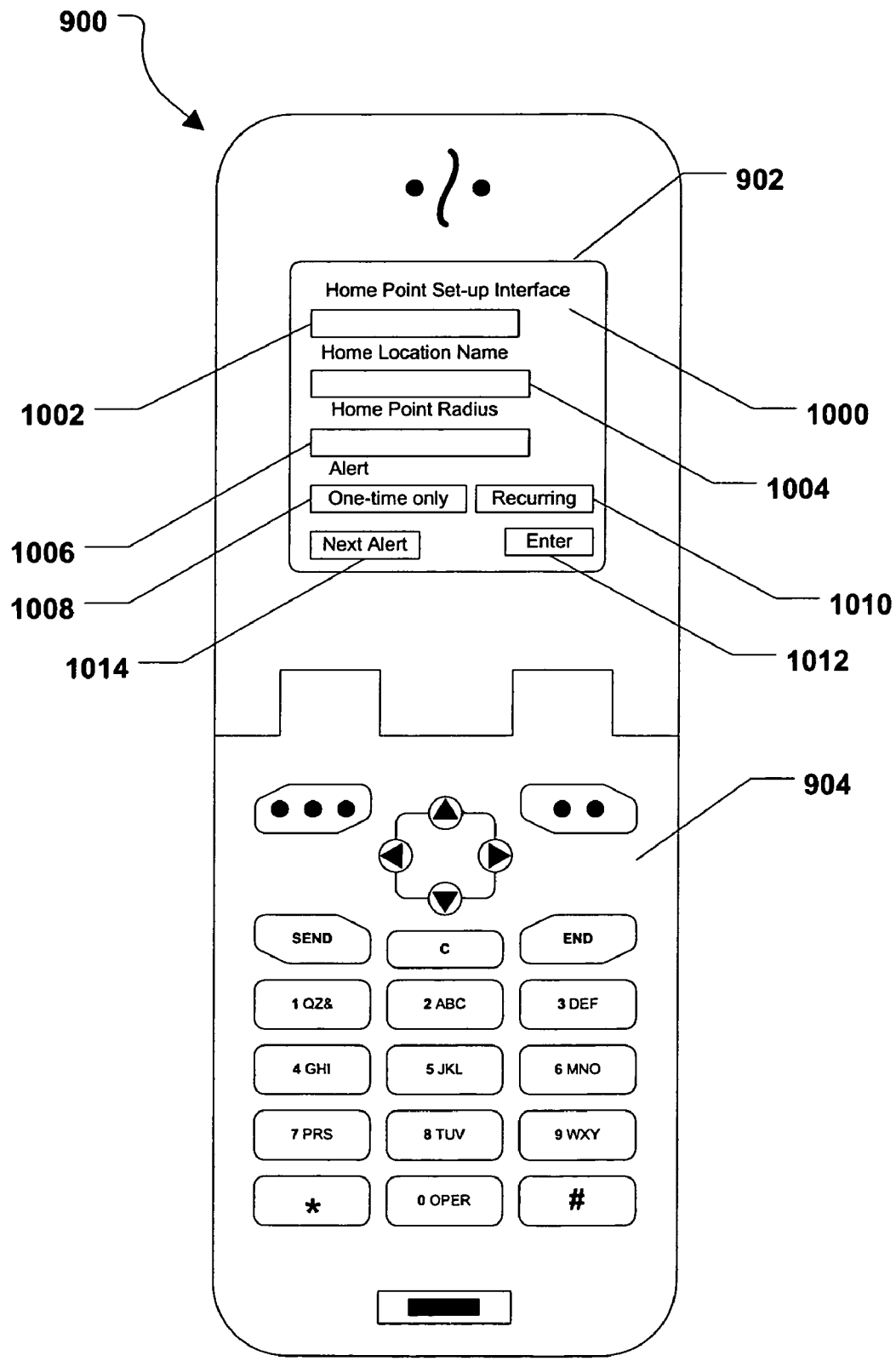
FIG. 10 is a diagram of a portable computing device showing a second user interface.

As illustrated in FIG. 10, the home point set-up interface 1000 includes a "home location name" input field 1002 in which a user can input the name of the home location associated with the previously set home point. Further, the home point set-up interface 1000 includes a "home point radius" input field 1004 in which a user can input a radius associated with the home point. Additionally, the home point set-up interface 1000 includes an "alert" input field 1006 in which a user can input an alert associated with the home location. The home point set-up interface 1000 also includes a "one-time only" soft button 1008 and a "recurring" soft button 1010 that can be selected in order to indicate whether the alert should be provided at a single time or at multiple recurring times.

FIG. 10 also indicates that the home point set-up interface 1000 can include an "enter" soft button 1012 that can be toggled when the user is finished inputting an alert to the alert input field 1006. Further, the home point set-up interface 1000 can include a "next alert" soft button 1014 that can be selected if the user wants to input another alert for the home location to the portable computing device.

Figure 11:
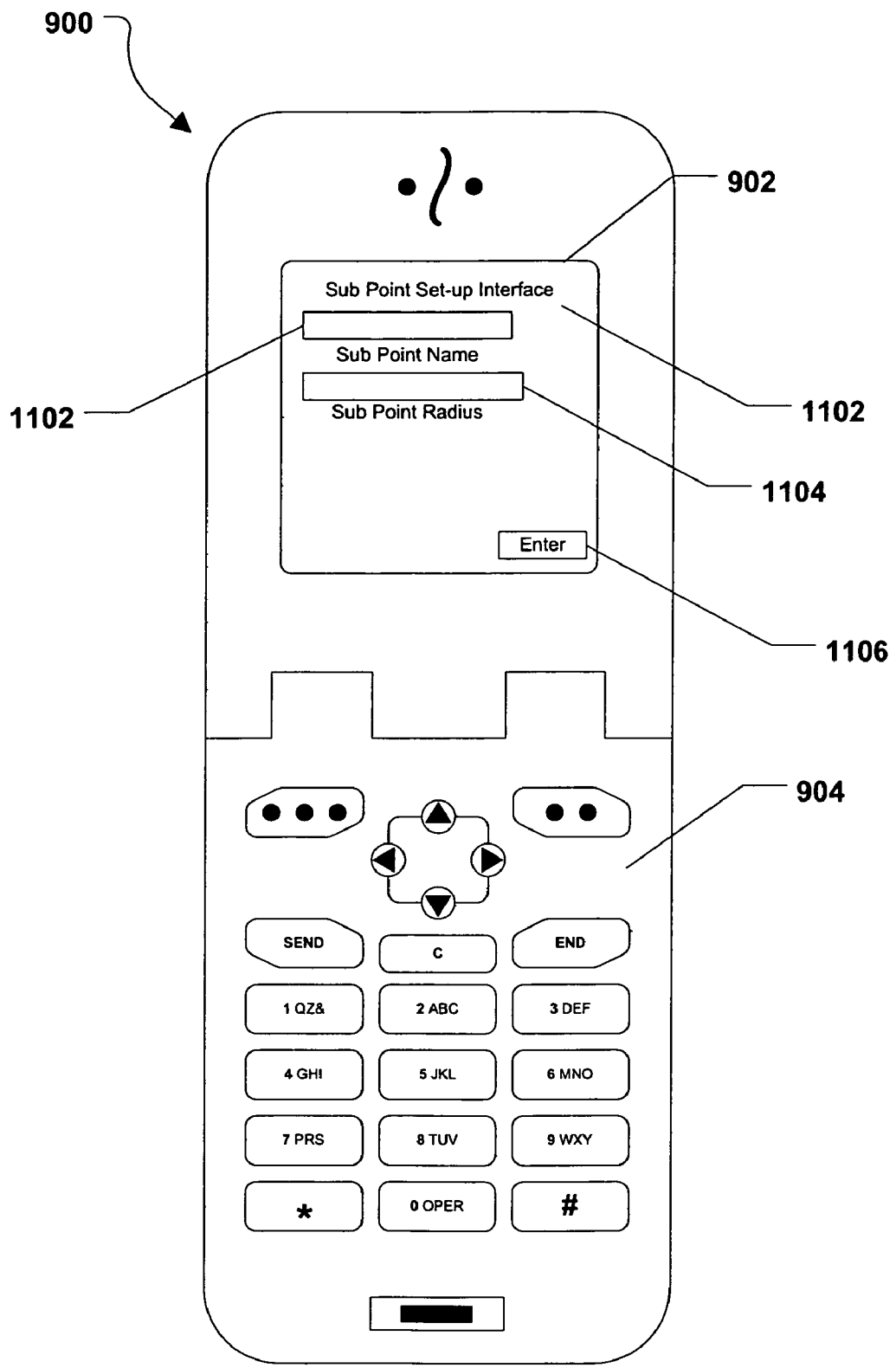
FIG. 11 is a diagram of a portable computing device showing a third user interface.

Returning to FIG. 9, when the "set sub point" soft button 910 is selected, a sub point set-up interface 1100, illustrated in FIG. 11, can be presented to the user. As depicted in FIG. 11, the sub point set-up interface 1100 includes a "sub point name" input field 1102 in which a user can input the name of the sub point associated with the previously set sub point. Moreover, the sub point set-up interface 1100 includes a "sub point radius" input field 1104 in which a user can input a radius associated with the sub point. FIG. 11 also indicates that the sub point set-up interface 1100 can include an "enter" soft button 1106 that can be toggled when the user is finished inputting the information associated with the sub point previously inputted to the portable computing device.

Figure 12:
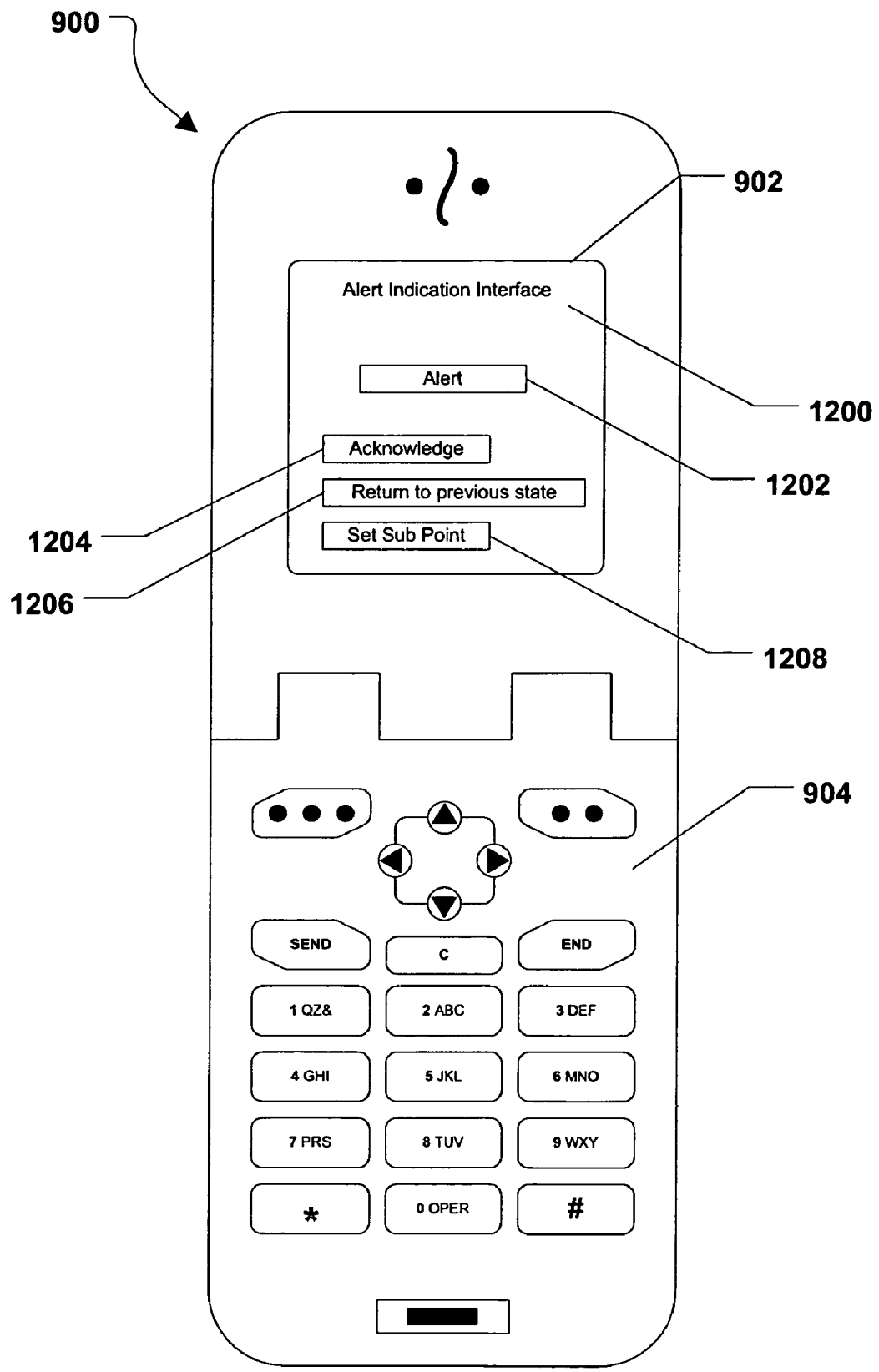
FIG. 12 is a diagram of a portable computing device showing a fourth user interface.

FIG. 12 illustrates an alert indication interface 1200 that can be presented to a user via the display 902 of the portable computing device 900. The alert indication interface 1200 includes an alert 1202. The alert can be a reminder not to forget something or a wake up alarm. Further, in addition to a visual indication, the alert 1202 can include an audible indication broadcast by the portable computing device, e.g., via a speaker at the portable computing device. FIG. 12 shows that the alert indication interface 1200 can also include an "acknowledge" soft button 1204 that can be selected by a user to acknowledge an alert. Also, the alert indication interface 1200 can include a "return to previous state" soft button 1206 that can be selected by a user to prevent the portable computing device from changing states when the portable computing device has not reached an entry indication perimeter or a departure indication perimeter. In a particular embodiment, the alert indication interface 1200 can also include a "set sub point" soft button 1208 that can selected by a user when the portable computing device has not reached an entry indication perimeter or a departure indication perimeter. By selecting the "set sub point" soft button 1208, the virtual perimeter for a home location and the corresponding entry indication perimeter and the corresponding departure indication perimeter can be modified. Moreover, when the "set sub point" soft button 1208 is selected at the alert indication interface 1200, the sub point set-up interface shown in FIG. 11 can be presented at the portable computing device.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A method of processing location data at a portable computing device, the method comprising:
   receiving information associated with a user defined location at the portable computing device, the information including a central point and an entry indication perimeter;
   receiving at least one entry alert associated with the user defined location at the portable computing device;
   creating a subpoint via user selection based upon a location of the portable computing device when the portable computing device has not reached the entry indication perimeter associated with the central point of the user defined location, wherein the location associated with the subpoint is different than the location associated with the central point;
   modifying the entry indication perimeter by the subpoint to generate a modified entry indication perimeter defined by a combination of the entry indication perimeter surrounding the central point and a subpoint entry indication perimeter surrounding the subpoint;
   monitoring a location of the portable computing device;
   determining when the portable computing device crosses the modified entry indication perimeter indicating that the portable computing device is proximate to the user defined location; and
   triggering the at least one entry alert when the portable computing device is determined to be proximate to the user defined location.

2. The method of claim 1, wherein the entry indication perimeter is a distance from the central point.

3. The method of claim 1, wherein the at least one entry alert is a one time only entry alert.

4. The method of claim 1, further comprising switching the portable computing device from a roaming state to an entry state indicating that the portable computing device is about to enter the user defined location.

5. The method of claim 4, further comprising indicating that the portable computing device has switched to the entry state.

6. The method of claim 5, further comprising presenting the at least one entry alert on the portable computing device.

7. The method of claim 6, further comprising receiving an indication to switch the portable computing device to the roaming state.

8. The method of claim 1, wherein the modified entry indication perimeter comprises the combination of the area of the entry indication perimeter surrounding the central point and the area of the subpoint entry indication perimeter surrounding the subpoint.

9. The method of claim 6, further comprising switching the portable computing device from the entry state to a home state.

10. The method of claim 9, further comprising waiting a predetermined time period before switching to the home state.

11. The method of claim 10, further comprising determining whether the portable computing device is moving toward the central point.

12. The method of claim 11, further comprising presenting a reminder to the user.

13. A method of processing location data at a portable computing device, the method comprising:
   associating an entry indication perimeter with a central point of a selected location;
   monitoring a location of the portable computing device;
   indicating that the portable computing device is proximate to the selected location when the portable computing device crosses the entry indication perimeter associated with the central point of the selected location;
   creating a subpoint via user selection based upon the location of the portable computing device when the entry indication perimeter has not been reached, wherein the location associated with the subpoint is different than the location associated with the central point; and
   modifying the entry indication perimeter by the subpoint to generate a modified entry indication perimeter defined by a combination of the entry indication perimeter surrounding the central point and a subpoint indication perimeter surrounding the subpoint.

14. The method of claim 13, wherein the modified entry indication perimeter comprises the combination of the area of the entry indication perimeter surrounding the central point and the area of the subpoint entry indication perimeter surrounding the subpoint.

15. The method of claim 13, further comprising modifying the modified entry indication perimeter by a user-defined distance.

16. A computer-readable medium comprising instructions, which, when executed by a computer, cause the computer to perform operations, the instructions comprising:
   at least one instruction for associating an entry indication perimeter with a central point of a selected location;
   at least one instruction for monitoring a location of a portable computing device;
   at least one instruction for indicating that the portable computing device is proximate to the selected location when the portable computing device crosses the entry indication perimeter associated with the central point of the selected location;
   at least one instruction for creating a subpoint via user selection based upon the location of the portable device when the entry indication perimeter has not been reached, wherein the location associated with the subpoint is different than the location associated with the central point; and
   at least one instruction for modifying the entry indication perimeter by the subpoint to generate a modified entry indication perimeter defined by a combination of the entry indication perimeter surrounding the central point and a subpoint indication perimeter surrounding the subpoint.

17. The computer-readable medium of claim 16, wherein the modified entry indication perimeter comprises the area of the entry indication perimeter surrounding the central point and the area of the subpoint entry indication perimeter surrounding the subpoint.

18. The computer-readable medium of claim 16, further comprising at least one instruction for modifying the modified entry indication perimeter by a user-defined distance.

19. A portable computing device capable of handling instructions, the portable computing device comprising:
means for associating an entry indication perimeter with a central point of a selected location;
means for monitoring a location of a portable computing device;
means for indicating that the portable computing device is proximate to the selected location when the portable computing device crosses the entry indication perimeter associated with the central point of the selected location;
means for creating a subpoint via user selection based upon the location of the portable computing device when the entry indication perimeter has not been reached, wherein the location associated with the subpoint is different than the location associated with the central point; and
means for modifying the entry indication perimeter by the subpoint to generate a modified entry indication perimeter defined by a combination of the entry indication perimeter surrounding the central point and a subpoint indication perimeter surrounding the subpoint.

20. The portable computing device of claim 19, wherein the modified entry indication perimeter comprises the area of the entry indication perimeter surrounding the central point and the subpoint entry indication perimeter surrounding the subpoint.

21. The portable computing device of claim 19, further comprising means for modifying the entry indication perimeter by a user-defined distance.

22. A computer-readable medium comprising instructions, which, when executed by a computer, cause the computer to perform operations, the instructions comprising:
at least one instruction for receiving information associated with a user defined location at a portable computing device, the information including a central point and an entry indication perimeter;
at least one instruction for creating a subpoint via user selection based upon a location of the portable computing device when the portable computing device crosses the entry indication perimeter, wherein the location associated with the subpoint is different than the location associated with the central point;
at least one instruction for modifying the entry indication perimeter by the subpoint to generate a modified entry indication perimeter defined by a combination of the entry indication perimeter surrounding the central point and a subpoint entry indication perimeter surrounding the subpoint;
at least one instruction for receiving at least one entry alert associated with the user defined location at the portable computing device;
at least one instruction for monitoring a location of the portable computing device;
at least one instruction for determining when the portable computing device crosses modified the entry indication perimeter indicating that the portable computing device is proximate to the user defined location; and
at least one instruction for triggering the at least one entry alert when the portable computing device is determined to be proximate to the user defined location.

23. The computer-readable medium of claim 22, wherein the entry indication perimeter is a distance from the central point.

24. The computer-readable medium of claim 22, wherein the at least one entry alert is a one time only entry alert.

25. The computer-readable medium of claim 22, further comprising at least one instruction for switching the portable computing device from a roaming state to an entry state indicating that the portable computing device is about to enter the user defined location.

26. The computer-readable medium of claim 25, further comprising at least one instruction for indicating that the portable computing device has switched to the entry state.

27. The computer-readable medium of claim 26, further comprising at least one instruction for presenting at least one entry alert on the portable computing device.

28. The computer-readable medium of claim 27, further comprising at least one instruction for receiving an indication to switch the portable computing device to the roaming state.

29. The computer-readable medium of claim 22, wherein the modified entry indication perimeter comprises the combination of the area of the entry indication perimeter surrounding the central point and the subpoint entry indication perimeter surrounding the subpoint.

30. The computer-readable medium of claim 27, further comprising at least one instruction for switching the portable computing device from the entry state to a home state.

31. The computer-readable medium of claim 30, further comprising at least one instruction for waiting a predetermined time period before switching to the home state.

32. The computer-readable medium of claim 31, further comprising at least one instruction for determining whether the portable computing device is moving toward the central point.

33. The computer-readable medium of claim 32, further comprising at least one instruction for presenting a reminder to the user.

34. A portable computing device capable of handling instruction, the portable computing device comprising:
means for receiving information associated with a user defined location at the portable computing device, the information including a central point and an entry indication perimeter;
means for creating a subpoint via user selection based upon a location of the portable computing device when the portable computing device crosses the entry indication perimeter associated with the central point of the user defined location, wherein the location associated with the subpoint is different than the location associated with the central point;
means for modifying the entry indication perimeter by the subpoint to generate a modified entry indication perimeter defined by a combination of the entry indication perimeter surrounding the central point and a subpoint entry indication perimeter surrounding the subpoint;
means for receiving at least one entry alert associated with the user defined location at the portable computing device;
means for monitoring a location of the portable computing device;
means for determining when the portable computing device crosses the modified entry indication perimeter indicating that the portable computing device is proximate to the user defined location; and means for triggering the at least one entry alert when the portable computing device is determined to be proximate to the user defined location.

35. The portable computing device of claim 34, wherein the entry indication perimeter is a distance from the central point.

36. The portable computing device of claim 34, wherein the at least one entry alert is a one time only entry alert.

37. The portable computing device of claim 34, further comprising means for switching the portable computing device from a roaming state to an entry state indicating that the portable computing device is about to enter the user defined location.

38. The portable computing device of claim 37, further comprising means for indicating that the portable computing device has switched to the entry state.

39. The portable computing device of claim 38, further comprising means for presenting the at least one entry alert on the portable computing device.

40. The portable computing device of claim 39, further comprising means for receiving an indication to switch the portable computing device to the roaming state.

41. The portable computing device of claim 34, wherein the modified entry indication perimeter comprises the combination of the area of the entry indication perimeter surrounding the central point and the subpoint entry indication perimeter surrounding the subpoint.

42. The portable computing device of claim 39, further comprising means for switching the portable computing device from the entry state to a home state.

43. The portable computing device of claim 42, further comprising means for waiting a predetermined time period before switching to the home state.

44. The portable computing device of claim 43, further comprising means for determining whether the portable computing device is moving toward the central point.

45. The portable computing device of claim 44, further comprising means for presenting a reminder to the user.

46. A portable computing device capable of handling instructions, the portable computing device comprising:
    logic for receiving information associated with a user defined location at the portable computing device, the information including a central point and an entry indication perimeter;
    logic for creating a subpoint via user selection based upon a location of the portable computing device when the portable computing device crosses the entry indication perimeter associated with the central point of the user defined location, wherein the location associated with the subpoint is different than the location associated with the central point;
    logic for modifying the entry indication perimeter by the subpoint to generate a modified entry indication perimeter defined by a combination of the entry indication perimeter surrounding the central point and a subpoint entry indication perimeter surrounding the subpoint;
    logic for receiving at least one entry alert associated with the user defined location at the portable computing device;
    logic for monitoring a location of the portable computing device;
    logic for determining when the portable computing device crosses the entry indication perimeter indicating that the portable computing device is proximate to the user defined location; and
    logic for triggering the at least one entry alert when the portable computing device is determined to be proximate to the user defined location.

47. A portable computing device capable of handling instructions, the portable computing device comprising:
    logic for associating an entry indication perimeter with a central point of a selected location;
    logic for monitoring a location of the portable computing device;
    logic for indicating that the portable computing device is proximate to the selected location when the portable computing device crosses the entry indication perimeter associated with the central point of the selected location;
    logic for creating a subpoint via user selection based upon the location of the portable device when the entry indication perimeter has not been reached, wherein the location associated with the subpoint is different than the location associated with the central point; and
    logic for modifying the entry indication perimeter by the subpoint to generate a modified entry indication perimeter defined by a combination of the entry indication perimeter surrounding the central point and a subpoint indication perimeter surrounding the subpoint.

48. A method of processing location data at a portable computing device, the method comprising:
    receiving central point information associated with a user defined location at the portable computing device, the central point information including a central point and an entry indication perimeter surrounding the central point;
    receiving subpoint information associated with a user defined location at the portable computing device, the subpoint information including a user selected subpoint and a subpoint entry indication perimeter surrounding the subpoint, wherein the location associated with the subpoint is different than the location associated with the central point;
    modifying the entry indication perimeter based on the subpoint information to generate a modified entry indication perimeter defined by a combination of the entry indication perimeter surrounding the central point and the subpoint entry indication perimeter surrounding the subpoint;
    receiving at least one entry alert for the user defined location at the portable computing device;
    monitoring a location of the portable computing device;
    determining when the portable computing device crosses the modified entry indication perimeter indicating that the portable computing device is proximate to the user defined location; and
    triggering the at least one entry alert when the portable computing device is determined to be proximate to the user defined location.

* * * * *